United States Patent [19]

Regnat

[11] 4,407,180
[45] Oct. 4, 1983

[54] AIRCRAFT LOAD LOCK, ESPECIALLY BOMB LOCK INCLUDING CENTRAL OPERATING MEANS

[75] Inventor: Karl Regnat, Siegertsbrunn, Fed. Rep. of Germany

[73] Assignee: Messerschmitt-Boelkow-Blohm Gesellschaft mit beschraenkter Haftung, Munich, Fed. Rep. of Germany

[21] Appl. No.: 264,700

[22] Filed: May 18, 1981

[30] Foreign Application Priority Data

May 23, 1980 [DE] Fed. Rep. of Germany ....... 3019782

[51] Int. Cl.³ ............................................. F41F 5/02
[52] U.S. Cl. ................. 89/1.5 B; 89/1.5 D; 89/1.5 F
[58] Field of Search ............... 89/1.5 R, 1.5 B, 1.5 C, 89/1.5 D, 1.5 F, 1.5 G, 1.5 H; 244/137 R

[56] References Cited

U.S. PATENT DOCUMENTS 2,918,845 12/1959 Fleming ............................ 89/1.5 D
3,898,909 8/1975 Craigie ............................. 89/1.5 F
3,998,124 12/1976 Milhous et al. .................... 89/1.5 D
4,313,582 2/1982 Hasquenoph et al. ............. 89/1.5 G Primary Examiner—Stephen C. Bentley
Assistant Examiner—Maureen T. Ryan
Attorney, Agent, or Firm—W. G. Fasse; D. H. Kane, Jr.

[57] ABSTRACT

The present load lock secures loads, such as containers, or weapons, such as bombs, to an aircraft thereby using a single or multiple point suspension system while simultaneously clawing or clamping the load to prevent it from undesired movements. The clawing or clamping is accomplished by the same centrally located mechanism which is operated manually or by an electric drive, whereby operation in one direction results in clawing while operation in the opposite direction results in clamping. In both instances the force causing the clamping or clawing is adjustable as a biasing force. The suspension of the load is accomplished by a power operated hook reaching into an eye of the load. The arming or fuzing of a weapon held in the lock is accomplished by a mechanism arranged laterally in the lock housing for easy access. All the operating elements for the clawing, clamping, fuzing, unlocking and any other function are arranged symmetrically substantially in a common plane in such a manner that the lock on each side of the aircraft may be handled and serviced externally even when a load is held in the lock.

11 Claims, 11 Drawing Figures

AIRCRAFT LOAD LOCK, ESPECIALLY BOMB LOCK INCLUDING CENTRAL OPERATING MEANS

CROSS REFERENCE TO RELATED APPLICATION

The present application corresponds to German Ser. No. P 3,019,782.1, filed on May 23, 1980 in the Federal Republic of Germany. The priority of the German filing date is claimed for the present application.

BACKGROUND OF THE INVENTION

The present invention relates to an aircraft load lock, especially to a bomb lock including central operating means. Such locks are known for externally securing loads such as containers and/or bombs to an aircraft body or to the aircraft wings, whereby single or multiple suspension points are used and the load is clawed or clamped so that it is held in a fixed position and prevented from unpermissably moving in its suspension. Load or bomb locks of the above type are known in the art in different constructions. However, prior art locks of this type have a number of disadvantages. One vexing problem, among others, has been the accessibility of the lock for maintenance and servicing purposes, especially when a load is suspended in prior art locks. Further, the operating requirements of prior art locks are quite involved so that a substantial number of man hours is required for such operating procedures as well as for the mounting or assembly and disassembly of such prior art locks.

OBJECTS OF THE INVENTION

In view of the above it is the aim of the invention to achieve the following objects singly or in combination:

to construct a load or bomb lock for an aircraft which avoids the mentioned disadvantages of the prior art, especially to provide a lock which is easily accessible for its operation, service, or maintenance even with a load suspended therefrom;

to provide a lock of the mentioned type which is compact to utilize the available space most efficiently and to provide for an automatic servicing operation, especially for an automatic load suspension;

to assure that the arming or so-called fuzing or defuzing of a load such as a bomb may be accomplished with a high degree of safety and reliability; and to minimize the operational steps required for the operation of such lock so that the time required for reloading or rearming an aircraft is substantially reduced.

SUMMARY OF THE INVENTION

According to the invention there is provided a bomb or load lock in which the clawing or clamping of the load is accomplished by means of a central manual or electric drive mechanism to provide an adjustable biasing. The arming or so-called fuzing of the load, such as a bomb, is accomplished by a laterally arranged mechanism including a magnet or electrical arming means, whereby all operating devices for the clawing, the clamping, the arming or fuzing, the unlocking, the throttling, and the insertion of cartridges are arranged in a plane symmetrically in such a manner that the lock permits an external operation on each side of the aircraft even with a load suspended in the lock.

More specifically, the present lock may be constructed as a double lock in which most components are provided twice and mirror-symmetrically relative to a central plane of symmetry. All operating elements are externally accessible, for example, through sockets into which a crank may be inserted for a manual drive. The operational components include a load suspending means arranged in the lock housing for cooperation with a load holding means secured to a load, for example, in the form of an eyelet into which a hook of the load suspending means reaches. First drive means are arranged in the housing and connected to the load suspending means for controlling said load suspending means in its cooperation with said load holding means of the load. Load securing means including clawing and clamping means are operatively arranged in the lock housing for clawing or clamping the load suspended from the lock by the load suspending means. Second drive means are operatively arranged also in the housing and connected to the load securing means for performing the clawing or clamping, depending on the direction of operation of the second drive means. All operational components are arranged substantially in the same plane for compactness and lateral accessibility. The present lock further comprises fuzing means including operating means for said fuzing means operatively arranged laterally in the housing and connectable to a load for arming or fuzing the load, whereby all of the operational components are constructed and arranged symmetrically relative to the given plane in the lock housing so that the load lock assures an external operability and serviceability on each side of an aircraft even if a load is held in the lock.

BRIEF FIGURE DESCRIPTION

In order that the invention may be clearly understood, it will now be described, by way of example, with reference to the accompanying drawings, wherein.

Figure 3:
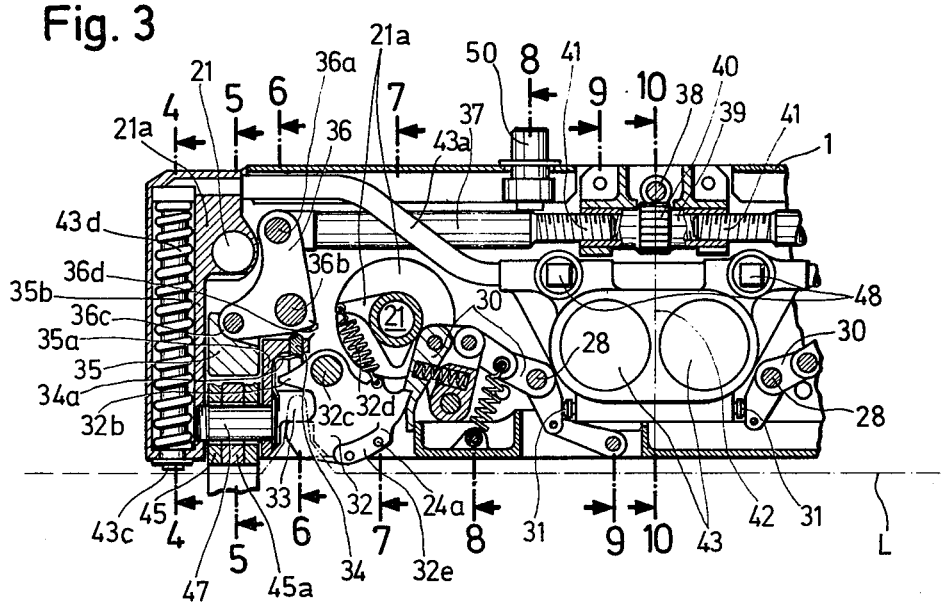
FIG. 3 is a sectional view along section line 3—3 in FIG. 1, whereby again substantially only one half of the lock is shown, the other half being arranged symmetrically to the shown half.
Figure 5:
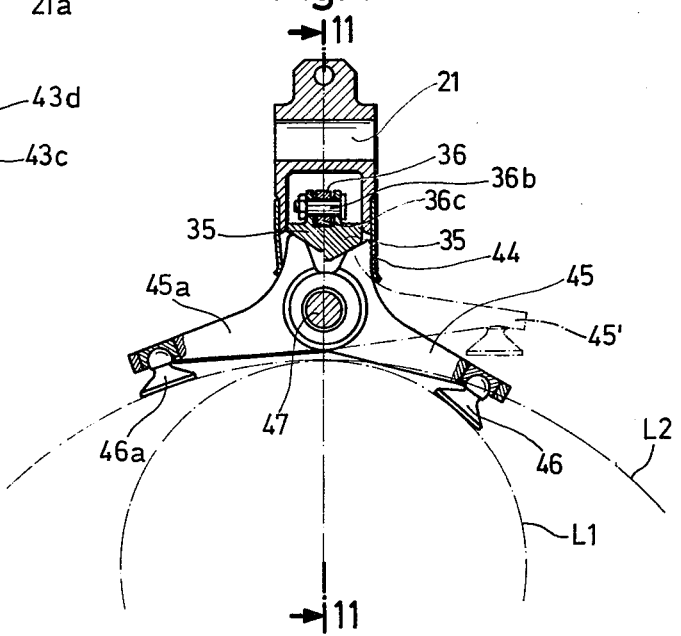
FIG. 5 is a sectional view along section line 5—5 in FIG. 3.
Figure 10:
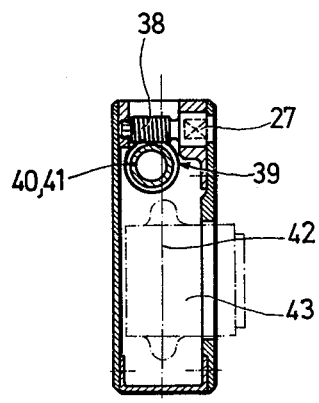
Figure 11:
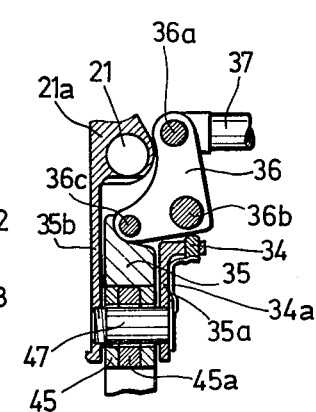

FIG. 10 is a sectional view along section line 10—10 in FIG. 3, said section line 10—10 simultaneously defining a central plane of symmetry; and FIG. 11 is a sectional view along section line 11—11 in FIG. 5, said section line 11—11 also defining a plane of the lock housing in which substantially all of the operational components are located.

DETAILED DESCRIPTION OF PREFERRED EXAMPLE EMBODIMENTS AND OF THE BEST MODE OF THE INVENTION

The lock shown in the drawings is suitable for bombs and/or other loads which may have a round shape or a flat shape and which may have varying sizes as shown at L1 and L2 in FIG. 5. The lock is suitable for a single point suspension or, if larger loads are involved, for a multiple point suspension and may be used for containers as well. The clawing and clamping means will first be described.

Figure 6:
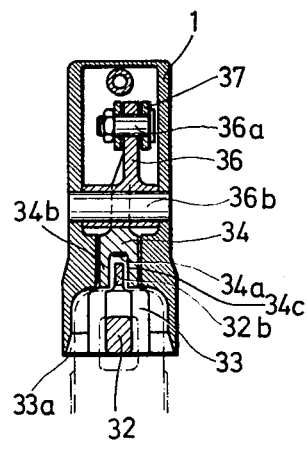
FIG. 6 is a sectional view along section line 6—6 in FIG. 3.

Each load L is provided with at least one, preferably with a plurality of suspending eyelets 33 as shown in dash-dotted lines in FIG. 3. Smaller loads are subjected to a clawing action as will be described. When larger loads are involved, the clawing is not effective, instead a clamping action is accomplished through a plunger 34 which has two forked legs 34b, 34c reaching around a cam member 32b to press down on the eyelet 33 of a load L as best seen in FIG. 6. The clamping by pressing down of the plunger 34 is accomplished by the cam surface 36d of a bell crank 36 which is rotated clockwise for this purpose around its journal shaft 36b. In this instance the connecting rod 37 journalled to the upper journal point 36a of the bell crank 36 is rotated in one given direction by the spindle 41 through the spindle nut 40 cooperating with the worm gear 38. Thus, the rod 37 acts as a tension transmitting rod or as a pull rod for the clamping operation. As a result, the cam surface 36c of the bell crank 36 is lifted off the wedging pressure members 35, whereby the claw arms 45 and 45a are lifted by respective springs 44 into the dash-dotted line 45' shown in FIG. 5. Accordingly, the claws 46 and 46a are lifted off the load L1, for example, as shown in FIG. 5 when the plunger 34 bears down onto the eyelet 33 of a load for the clamping action. A spring 34a returns the plunger 34 into a non-clamping position.

On the other hand, when a clawing operation is to be accomplished the rod 37 is rotated in the opposite direction, thereby pushing the bell crank 36 in a counterclockwise direction. As a result, the cam surface 36d is lifted off the plunger 34 and the cam surface 36c bears down on the wedging pressure members 35, thereby forcing the claw arms 45 and 45a into the full line position shown in FIG. 5, whereby the claws 46, 46a bear down on the respective load, and whereby the spring 34a lifts the plunger 34 off the eyelet 33 of a load. In both instances, for the clawing or for the clamping the same drive means are employed which may, for example, comprise a crank inserted into a socket 27 shown in FIG. 2 for driving the worm gear 38. Instead, the worm gear 38 may be driven through an electric motor not shown. The threading of the drive spindle 41 which is shown as a double spindle as best seen in FIG. 3, is such, that a certain self-locking provides the required biasing. As mentioned, if the clawing is to be released, the claws 46, 46a are brought into the dash-dotted line 45' shown in FIG. 5 by the respective leaf springs 44, whereby the respective wedge members 35 are also lifted upwardly into the rest position 45' shown in FIG. 5.

When the clawing levers 45, 45a are in the dashed line position of FIG. 5, it is possible to insert a load or rather the holding means in the form of an eyelet 33 into the respective opening 33a shown in FIG. 6 of the lock 20. The opening 33a is provided in the bottomside of the slender lock housing 1 as best seen in FIG. 6. The clawing levers 45, 45a are hinged to a hinge pin 47 held in the housing 1, see also FIG. 11.

Figure 1:
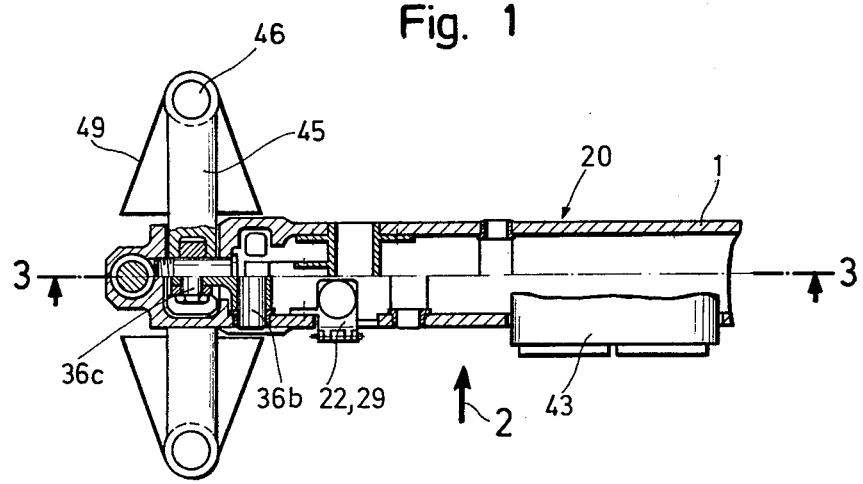
FIG. 1 is a plan view partially in section of a lock according to the invention, whereby only one half of the lock is shown, the other half being symmetrical to the shown half.
Figure 2:
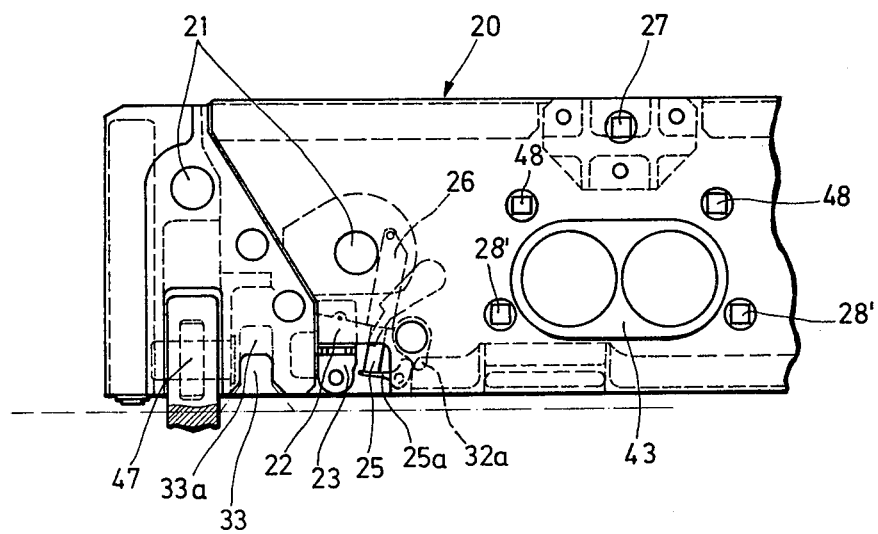
FIG. 2 is a side view onto a lock in the direction of the arrow 2 in FIG. 1.

The above mentioned electrical drive for the worm gear 38 may be provided in addition to the drive socket 27 shown in FIG. 2. In any event, the spindle nut 40 has a sufficient, horizontal or axial length so that the rod 37 with the spindle threadings 41 may be axially displaced to the right or to the left depending on the direction of rotation of the worm gear 38. Due to the axial displacement of the spindle nut 40 the loads are uniformly applied to the forward and rearward claws because tolerances are compensated by such axial displacement. Incidentally, the bell crank lever 36 journalled to the rod 37 at 36a and to a journal shaft 36b is provided with a ball type or curved cam surface 36c which cooperates or cams with the wedging members 35.

The wedging members 35 are guided in the lock housing 1 between wall members 35a and 35b as shown in FIGS. 3, 11. The wedging pressure transmitted as described above is divided into force components due to the wedge shape of the pressure members 35, whereby portions of the clawing forces, or rather of the clawing force components, cancel each other, thereby partially relieving the force transmitting means such as the rod 37 and the bell crank 36. Due to the above mentioned self-locking feature of the threadings 41 on the rod 37, the required bias is accomplished with a certain elasticity so that jamming is avoided.

In view of the just described function of the drive means it will be appreciated that the clawing is accomplished by rotating the worm gear 38 in one direction and that the clamping is accomplished by rotating the worm gear 38 in the opposite direction, whereby, as mentioned, the rod 37 functions either as a push rod or as a pull rod. In any event, the spring 34a biases the plunger 34 against the cam surface 36d of the bell crank 36, see FIG. 6.

The mechanism for locking and unlocking a load in the load lock will now be described. The locking means may also be driven manually by a crank shaft insertable into a socket 28' for operating a respective drive shaft 28 which in turn actuates a link mechanism 30. The link mechanism 30 is operatively connected to a locking cam disk 32 which has a notch below its clamping cam 32b for reaching into an eyelet 33, please see FIGS. 3 and 6 in conjunction. Thus, the locking is accomplished through the drive socket 28' and the unlocking is accomplished by rotating the cam disk 32 counterclockwise through the linkage system 30 in response to the operation of a double piston cylinder arrangement 31 which is effective on the linkage system 30. The pistons of the double piston cylinder arrangement 31 are operated, for example, by exploding respective cartridges inserted in cartridge chambers 43 shown in FIG. 3. For the locking operation the cam disk 32 rotates clockwise about its journal pin 32c. The cartridge chambers 43 are arranged centrally in the lock housing 1 and preferably symmetrically relative to a central plane 42. The double piston cylinder arrangement 31 is located symmetrically below the cartridge chambers 43.

The operating means 22 for arming or fuzing or bomb load will now be described. The fuze in a bomb not shown is connected to a wire 24 which is normally held by a bolt 24a shown in FIG. 7. Normally, when the fuze is not activated, the bolt is held in the position shown in FIG. 7 while the bomb is locked to the aircraft by the engagement of the cam disk 32 into the eyelet 33 as shown in FIG. 6. The mechanism may be operated in two ways to either drop a bomb in an armed or unarmed condition. Initially a loop or eyelet of the arming wire 24 is placed onto the free end of the bolt 24a by tilting the bolt arresting member 23 out of the way. If it now becomes necessary to release a bomb without fuzing the bomb, it is possible to release the wire 24 from the bolt 24a by pushing the bolt 24a inwardly by means of a spring 24b shown in FIG. 7, whereby the eyelet at the upper end of the wire 24 may slip off the bolt 24a past the arresting member 23 and the fuze is thus not activated. For this purpose an electromagnet 29 is deenergized.

Figure 7:
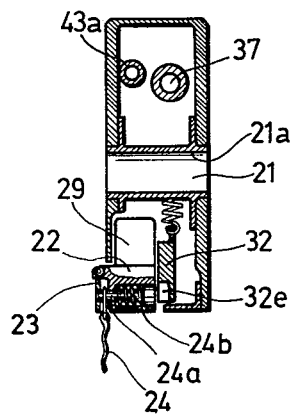
FIG. 7 is a sectional view along section line 7—7 in FIG. 3.
Figure 8:
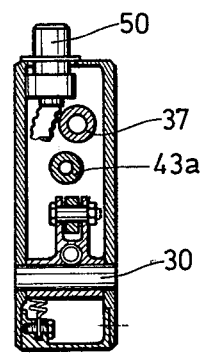
FIG. 8 is a sectional view along section line 8—8 in FIG. 3.
Figure 9:
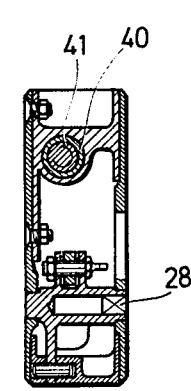
FIG. 9 is a sectional view along section line 9—9 in FIG. 3.

If it is intended to activate a fuze while a bomb is being dropped, the bolt 24a is maintained in the position shown in FIG. 7 by the electromagnet 29 during the unlocking of the cam disk 32 out of the eyelet 33, whereby the pull on the wire 24 activates the fuze, and the wire then breaks.

In addition to the just described mechanical fuzing the invention also provides for a fuzing by electrical means including a plug 25 normally held in position by a bail 25a as shown in FIG. 2. The plug 25 is inserted into a socket 26 shown in dashed lines in FIG. 2. The plug 25 is connected to the fuze in the bomb and when the cam disk 32 is released, the cam member 32a rotates the bail 25a counterclockwise so as to release the plug 25 for withdrawal from the socket 26, whereby the fuze is activated. Initially, the plug 25 is inserted into the socket 26 by manually moving the bail 25a out of the way when a bomb is inserted into the lock by moving the cam disk 32 into the position in which it engages the eyelet 33. Incidentally, the cam disk 32 is normally held in the load arresting position shown in FIG. 3 through a spring 32d urging the cam disk counterclockwise about the journal axis 32c, whereby the cam surface 32a, shown in FIG. 2, engages the bail 25a. For the above described blind discharge or unlocking of a load on the ground, the electromagnet 29 is deactivated, whereby the spring 24b urges the bolt 24a into a groove 32e of the cam disk 32 as shown in FIGS. 3 and 7. Thus, the bolt 24a may be held by the spring 24b in the retracted position even if the cam disk 32 moves counterclockwise for releasing the load and simultaneously the arming wire 24 from the bolt 24a.

As shown in FIGS. 2 and 3 the present lock comprises a total of four mounting bores 21. Two mounting bores 21 each are arranged on each side of the central symmetry plane or axis 42. The pylons of the aircraft fuselage or of the aircraft wing are inserted into these bores 21 for mounting the lock. It has been found that the number of bores, two on each side, is quite satisfactory for a lock according to the invention as compared to prior art locks all of which require a larger number of mounting bores. Another advantage of the invention is seen in that the present lock may be operated fully automatically if desired. The present lock provides for a clawing or clamping and is additionally mechanically and electrically accessible from one side in any condition even if a load is held in the lock so that the disassembly of the lock is avoided. Thus, all access problems encountered heretofore have been eliminated by the lock according to the invention. Moreover, the number of servicing or operating steps has been reduced so that the arming or reloading time has also been substantially reduced. Yet another advantage of the invention is seen in that all operating units are compact and thus may be housed in the narrow width housing 1 which has been found to satisfy all functional requirements of such a lock while simultaneously providing the necessary strength that must also be satisfied by such a lock in an optimal manner. Thus, the invention uses the available space in an advantageous manner while simultaneously achieving weight advantages by reducing the weight of the locks.

Although the invention has been described with reference to specific example embodiments, it will be appreciated, that it is intended, to cover all modifications and equivalents within the scope of the appended claims.

Figure 4:
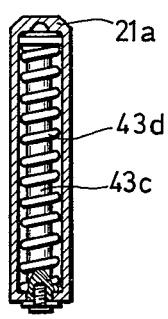
FIG. 4 is a sectional view along section line 4—4 in FIG. 3.

FIG. 4 illustrates a schematic section of the so-called discharge device in which the pressure plunger 43c discharges the load in response to the pressure applied by the cartridges 43 through the pressure control valves 48 and the conduit 43a. The pressure plunger 43c is provided with a reset spring 43d.

The link mechanism 34 for locking comprises in a known manner a lever with a compression spring and a claw and is actuated by the pressure plunger 31. An operation, however, may also take place through the manual unlocking device 28.

Reference number 50 relates to an electrical plug for the supply of the electrical locking devices. Reference number 21 designates the bores for the lock mounting in the diverse fittings 21a.

I claim:

1. A load lock for attaching a load having load holding means (33) to an aircraft, comprising lock housing means (1) and operational components in said lock housing means, said operational components including load suspending means (32) operatively arranged in said locking housing means in a given plane for cooperation with said load holding means, first drive means (28, 30, 31) operatively arranged substantially in said given plane in said lock housing and connected to said load suspending means (32) for controlling said load suspending means (32) in its cooperation with said load holding means (33), load securing means (34, 35, 36, 45, 46) operatively arranged in said lock housing means (1) for clawing or clamping a load suspended from the lock by the load suspending means (32), second drive means (37, 38, 39, 40) operatively arranged substantially in said given plane in said lock housing means and connected to said load securing means (34, 36) for performing said clawing or clamping depending on the direction of operation of said second drive means, and fuzing means (24) including operating means (22, 29) for said fuzing means operatively arranged laterally in said housing and connectable to a load for arming or fuzing said load, whereby all of said operational components are constructed and arranged symmetrically relative to said given plane so that said load lock assures an external operability and serviceability on each side of the aircraft even if a load is held in the load lock, wherein said load securing means comprise journal means (47) operatively held in said lock housing means and claw means (45, 45a, 46) journalled to said journal means for holding a load in a steady position, and wherein said second drive means comprise worm gear means (38, 40), wedging means (35) operatively arranged to force said claw means into a load clawing position, and linkage means (36, 37) connecting said worm gear means to said wedging means for applying a wedging force to said wedging means in response to rotation of said worm gear means in one direction, whereby said linkage means operate to transmit pressure, said load lock further comprising spring means (44) operatively connected to said claw means for returning the claw means into a rest position when the wedging force is released.

2. The load lock of claim 1, wherein said worm gear means comprise two threaded spindles (41) each having a threading direction opposite to the threading direction of the other spindle, a spindle nut interconnecting said spindles and arranged in a central plane (42) of symmetry and a worm drive member (38) also arranged in said central plane of symmetry for cooperation with said spindle nut to drive both threaded spindles whereby a double lock is provided the operational components of which are arranged symmetrically relative to said central plane (42) of symmetry.

3. The load lock of claim 1, wherein said load securing means further comprise a clamping plunger (34) operatively arranged to press against said load suspending means (32), and wherein said linkage means (36, 37) operatively connect said clamping plunger (34) to said worm gear means for applying a clamping force to said clamping plunger (34) in response to rotation of said worm gear means in the opposite direction, whereby at least one member of said linkage means operates to transmit a tension force, said load lock further comprising reset spring means (34a) arranged for returning said plunger (34) into a rest position.

4. The load lock of claim 3, wherein said second drive means are arranged to alternately drive said wedging means (35) and said clamping plunger (34).

5. The load lock of claim 1, further comprising electrical plug and socket means operatively arranged for cooperation with said fuzing means for arming a load, such as a bomb, and further operating means (23, 25a) for said plug means arranged in said lock housing means in such a position that said further operating means (23, 25a) are externally operable from a side of said lock housing means for arming a load.

6. The load lock of claim 5, wherein said further operating means for said plug means comprise a safety bail (25a), arresting means and release means (30, 32a) for said safety bail, said safety bail normally holding said plug means in said socket means, said arresting and release means tilting said safety bail away from said plug means for arming or fuzing a load, such as a bomb, by pulling said plug means out of said socket means in response to the dropping of a load.

7. The load lock of claim 1, wherein said first drive means for said suspending means (32) comprise a double plunger arrangement (31) which is located centrally in said lock housing means.

8. The load lock of claim 7, further comprising cartridge chamber means 43 arranged centrally in said lock housing means (1), said double piston cylinder arrangement (31) being located symmetrically below said cartridge chamber means (43).

9. The load lock of claim 1, wherein said load securing means comprise claw means (45, 45a, 46) extending out of said lock housing means, said load lock further comprising aerodynamically shaped cover means (49) for enclosing said claw means.

10. A load lock for attaching a load having load holding means (33) to an aircraft, comprising lock housing means (1) and operational components in said lock housing means, said operational components including load suspending means (32) operatively arranged in said lock housing means in a given plane for cooperation with said load holding means, first drive means (28, 30, 31) operatively arranged substantially in said given plane in said lock housing and connected to said load suspending means (32) for controlling said load suspending means (32) in its cooperation with said load holding means (33), load securing means (34, 35, 36, 45, 46) operatively arranged in said lock housing means (1) for clawing or clamping a load suspended from the lock by the load suspending means (32), second drive means (37, 38, 39, 40) operatively arranged substantially in said given plane in said lock housing means and connected to said load securing means (34, 36) for performing said clawing or clamping depending on the direction of operation of said second drive means, and fuzing means (24) including operating means (22, 29) for said fuzing means operatively arranged laterally in said housing and connectable to a load for arming or fuzing said load, whereby all of said operational components are constructed and arranged symmetrically relative to said given plane so that said load lock assures an external operability and serviceability on each side of the aircraft even if a load is held in the load lock, wherein said load suspending means (32) comprise a guide groove (32e) said fuzing means comprising an arming wire (24) and a bolt (24a) for holding said arming wire (24), said bolt (24a) riding in said guide groove (32a), said bolt (24a) cooperating with said operating means (22) for said fuzing means for releasing said arming wire (24) in response to the release movement of said load suspending means (32) when unlocking a load on the ground or when dropping an unarmed load.

11. The load lock of claim 10, wherein said operating means for said fuzing means comprise magnet means (29) arranged to hold said bolt (24a) in an arming wire arresting position, whereby a load, such as a bomb, is armed or fuzed when dropping out of said load lock.

* * * * *